W. L. LINDSAY.
UNIVERSAL JOINT.
APPLICATION FILED SEPT. 11, 1917.
1,277,960.
Patented Sept. 3, 1918.
2 SHEETS—SHEET 2.
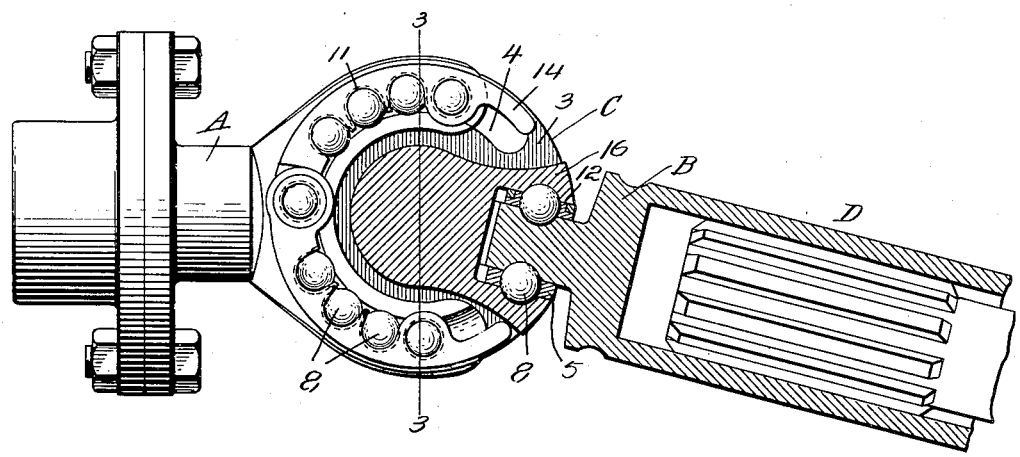
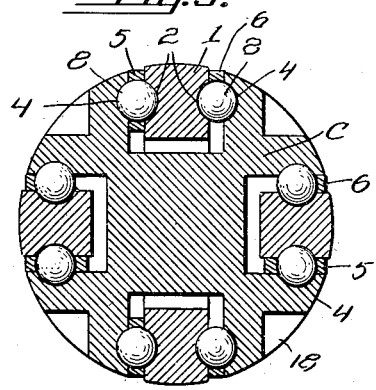
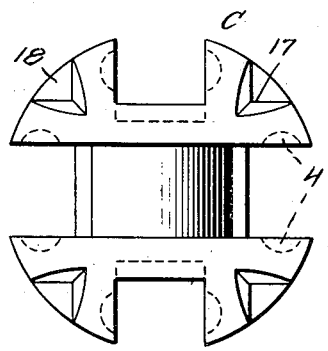
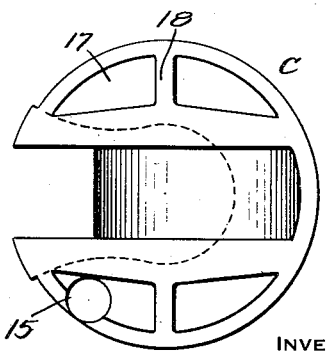
WITNESSES
INVENTOR
Walter L. Lindsay.
BY Victor J. Evans
ATTORNEY

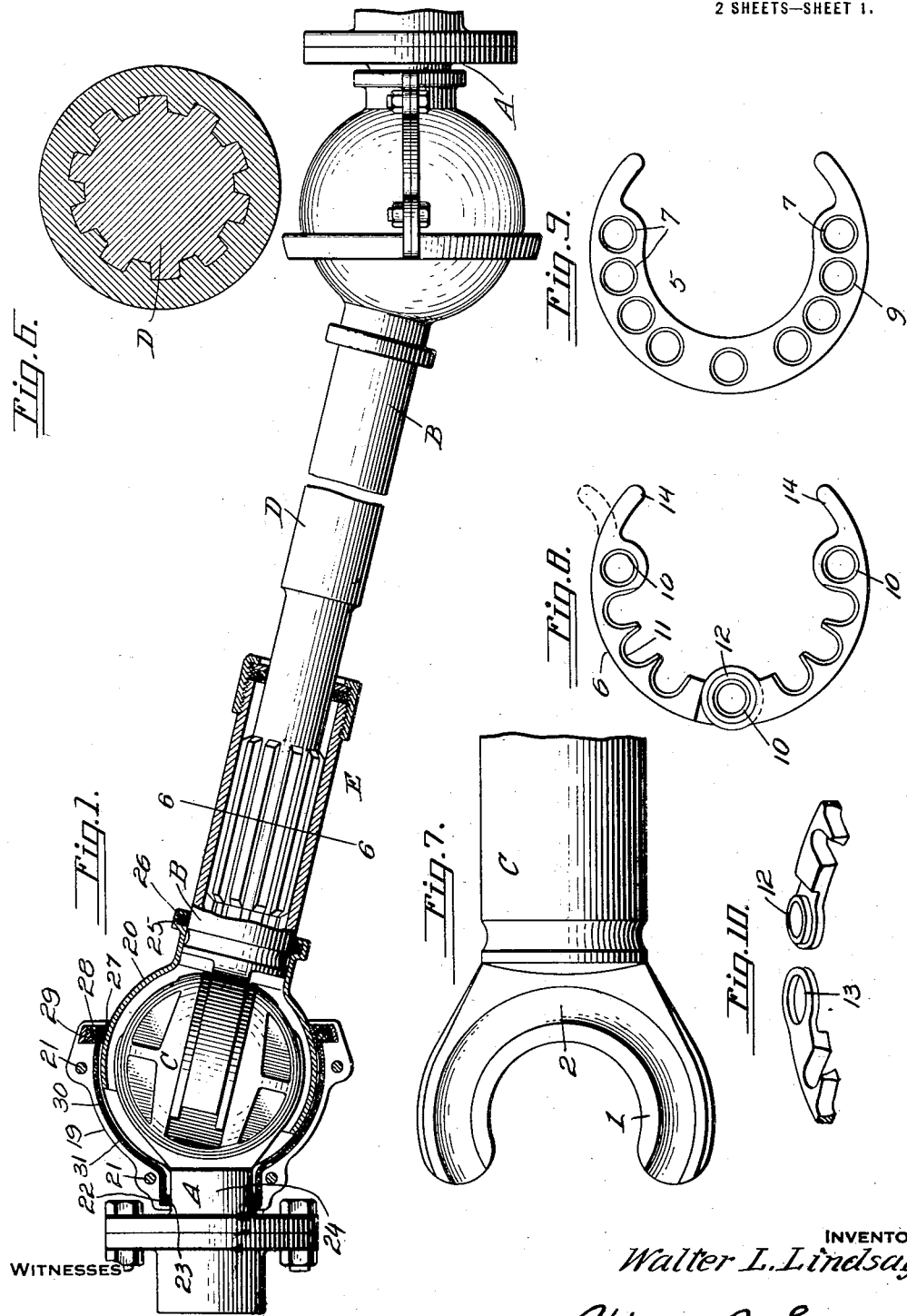

UNITED STATES PATENT OFFICE.

WALTER LEON LINDSAY, OF CHICAGO, ILLINOIS.

UNIVERSAL JOINT.

1,277,960.  Specification of Letters Patent.  Patented Sept. 3, 1918.

Application filed September 11, 1917. Serial No. 190,828.

*To all whom it may concern:*

Be it known that I, WALTER LEON LINDSAY, a citizen of the United States, residing at Chicago, in the county of Cook and State of Illinois, have invented new and useful Improvements in Universal Joints, of which the following is a specification.

This invention relates to universal joints and the object in view is to simplify and improve such joint and at the same time cheapen the cost of manufacture thereof.

One of the main objects of the invention is to produce a ball cage of superior construction and formation which will space and lock the balls in the ball races and at the same time facilitate the assembly and taking apart of the several parts of the joint.

Another object of the invention is to provide efficient means for housing in the working parts of the joint so as to retain lubricant and exclude dirt and other foreign matter.

Another object of the invention is to provide a special form and construction of what may be termed the intermediate member of the joint, securing greater lightness without impairing the strength of the joint as a whole.

With the above and other objects in view, the invention consists in the novel construction, combination and arrangement of parts, herein fully described, illustrated and claimed.

In the accompanying drawings:—

Figure 1 is a side elevation partly in section of a tumbling shaft showing the improved universal joint.

Fig. 2 is an enlarged sectional view of the joint.

Fig. 3 is a cross section on the line 3—3 of Fig. 2.

Fig. 4 is an end view of the intermediate member of the joint.

Fig. 5 is a side view of the same.

Fig. 6 is a cross section on the line 6—6 of Fig. 1 on an enlarged scale.

Fig. 7 is a fragmentary plan view of one of the end members of the joint.

Fig. 8 is a plan view of the jointed ball cage.

Fig. 9 is a similar view of a one-piece ball cage.

Fig. 10 is a fragmentary perspective view illustrative of the joint between the sections of the jointed ball cage.

Referring primarily to Fig. 1, A designates the outer end member of each of the universal joints illustrated therein, B represents the other or inner end member of each joint and C represents the spherical or intermediate member of the joint. D represents the shaft which is interposed between and which connects the two universal joints and which is of sectional formation, comprising a slip joint E as shown, the specific construction of which is not essential to the present invention.

In carrying out the present invention, each of the end members A and B is formed with an arcuate head 1 having in the opposite sides thereof arcuate ball races 2 which extend to the extremities of the head as best shown in Fig. 7. The intermediate or spherical member is formed with arcuate recesses 3 which are disposed at a right angle to each other, one of said recesses being adapted to receive the arcuate head 1 of the member A, and the other recess 3, facing the opposite direction, being adapted to receive the arcuate head 1 of the other member B, thus adapting the intermediate member C to oscillate in relation to the members A and B.

The opposite walls of each of the recesses 3 are formed with arcuate ball races 4 which lie opposite the ball races 2 of the heads 1 of the members A and B. This is clearly shown in Fig. 3. Mounted in each of the recesses 3 is a pair of ball cages 5 and 6. Each of said ball cages 5 and 6 is of arcuate shape. The cage 5 is provided with an arcuate series of pockets 7 which are round and intended to receive a corresponding number of balls 8. Each of the pockets 7 is countersunk or defined by concaved walls 9 so that the balls can only be removed from one side of the cage, the escape thereof through the other side of the cage being prevented by the concavity of the walls 9. The ball cage 6 is formed at the center thereof and adjacent to the ends thereof with round ball receiving pockets 10 corresponding in all respects with the pockets 7 of the ball cage 5. The ball cage 6 has other pockets 11 which are half round or open at their inner sides and the walls of said pockets 11 are also concaved to admit the balls at one side and prevent the escape thereof at the opposite side. The ball cage 6 has a knuckle joint between the sections thereof as illustrated in Figs. 8 and 10. One of the sections of the ball cage 6 is formed at the jointed end thereof with a tubular boss or ring flange 12 which is received in an opening 13 in the adjacent end of the other section as best illustrated in Fig. 10. One of the balls 8 is received in the opening of the tubular boss 12 the interior wall of which also is concaved to prevent the escape of the ball through the opposite side of the jointed portion of the cage.

As shown in Fig. 3, there are two one-piece ball cages and two jointed ball cages used in connection with the complete universal joint, and in connection with each of the heads 1, two ball cages are used, one cage 5 and another cage 6. Each of the cages is provided at both extremities thereof with a projecting tongue or finger 14 one of which is bendable as indicated by the dotted lines in Fig. 8 to facilitate assembling the joint and taking the same apart.

In assembling the joint, one set of balls 8 and a one-piece ball cage 5 are first placed in position. Then one of the heads 1 is associated with said balls and cage in the proper relation shown in the drawings. Then one end of the ball cage 6 is inserted in place and a ball 8 is inserted through a hole 15 in the member C of the joint, which hole 15 intersects one extremity of one of the ball races 4. Additional balls are now inserted through the same hole 15 sufficient in number to fill the half round pockets 11 between the first pocket 10 and the central pocket 10. The section of the ball cage 6 which has received the balls, is now pushed in place and another ball is inserted in the central pocket 10. The same operation is now continued with respect to the pockets 11 and the final pocket 10 and when the last ball has been inserted, the finger or tongue 14 is now pressed or bent inwardly from the dotted line position of Fig. 8 to the full line position of the same figure. Said tongue or finger 14 has now assumed the position shown in Fig. 2 where it partly overlaps the ball race 4 and the hole 15 so that the balls cannot escape in the same manner in which they were inserted. The fingers, tongues or projections 14 will strike against the central solid portion or body 16 of the member C of the joint and thereby prevent the balls from passing out of the extremities of the ball races 2 of the heads 1.

The spherical or intermediate member C is formed in the outer face thereof with triangular shaped recesses 17 separated from each other by intermediate webs or bridges 18. This materially reduces the weight of the intermediate member of the joint without impairing the strength thereof. A spherical housing surrounds the working parts of the joint as shown in Fig. 1, said housing embodying overlapping hemispherical sections 19 and 20. The outer section 19 is in turn diametrically split into two minor sections which are externally flanged and secured together by fastening means 21 such as bolts. The outer section 19 of the housing is formed with an internal annular recess 22 in which is placed an annular packing 23 which surrounds a cylindrical portion 24 of the member A. Likewise the inner member 20 of the housing is formed with an annular groove 25 to receive a packing ring 26 of any suitable material which surrounds a cylindrical portion of the member B. The outer section 19 of the housing is also formed with an annular groove 27 in which is placed a packing ring 28 of any suitable material, the same being surrounded by a split contracting spring packing or follower ring 29 which serves to compress the packing 28 and maintain an oil and dust tight contact with the inner member or the inner section 20 of the housing. The minor sections of the housing member 19 are formed in their meeting faces with arcuate grooves 30 to receive packing strips 31 of some such material as string packing which will extend from the packing ring 23 to the packing ring 28 without coming in contact with the outer surface of the housing member 20.

From the foregoing description taken in connection with the accompanying drawings it will now be seen that I have simplified and improved the universal joint and at the same time materially reduced the cost of manufacture thereof. Heretofore the ball races 2 have terminated short of the extremities of the arcuate head 1. I have been able to extend the ball races 2 to the extremities of the arcuate head by employing the novel form of ball cages 5 and 6 hereinabove particularly described, as the projections 14 serve by coming in contact with the body 16 of the intermediate or spherical member of the ball joint, to impart an oscillatory or sliding movement to the ball cages, preventing the balls from running out of the races 2 and also insuring the proper rolling movement of the balls and the reduction of friction to a minimum. It also tends to prevent wear by reason of the impact of the extremities of the ball cages against the limiting shoulders therefor provided by the end walls of the recesses 3 which end walls are formed by the body or solid portion 16 of the spherical member. Furthermore I have provided efficient means for excluding dirt and other foreign matter from the working parts of the joint by the use of the sectional spherical housing and the particular packing means used in connection therewith, one of the improved features of which resides in the use of the contracting spring ring 29.

I claim:—

1. In a universal joint, the combination of an intermediate member having a general spherical formation and formed with arcuate recesses arranged at a right angle to each other and facing in opposite directions, the opposite walls of said recesses being formed with arcuate ball races, end members having arcuate heads movable in said recesses and formed with arcuate ball races which extend to the extremities of said heads, arcuate ball cages interposed between each of said arcuate heads and the opposite walls of the races in which said head works, and balls in engagement with said cages and races, said cages serving to space the balls and the balls serving to lock the cages in place, each of said cages having projections at the opposite extremities thereof arranged to contact with the end walls of the recess in which the cage works to prevent the balls from over-running the ball races in the adjacent arcuate head.

2. In a universal joint, the combination of an intermediate member having a general spherical formation and formed with arcuate recesses arranged at a right angle to each other and facing in opposite directions, the opposite walls of said recesses being formed with arcuate ball races, end members having arcuate heads movable in said recesses and formed with arcuate ball races which extend to the extremities of said heads, arcuate ball cages interposed between each of said arcuate heads and the opposite walls of the races in which said head works, and balls in engagement with said cages and races, said cages serving to space the balls and the balls serving to lock the cages in place, each of said cages having projections at the opposite extremities thereof arranged to contact with the end walls of the recess in which the cage works to prevent the balls from over-running the ball races in the adjacent arcuate head, one of said projections being bendable and of a width to overlap the adjacent ball races of the arcuate head.

3. A universal joint comprising a substantially spherical intermediate member, end members having arcuate heads working in recesses in said intermediate member, and a housing inclosing the working parts of the joint and embodying overlapping hemispherical sections, the outermost sections of the housing being diametrically split and formed with an annular packing groove, a ring of packing material in said groove, a split contracting spring ring encircling said packing ring, and fastening means for securing the parts of said split section of the housing together.

4. A universal joint comprising a substantially spherical intermediate member, end members having arcuate heads working in recesses in said intermediate member, and a housing inclosing the working parts of the joint and embodying overlapping hemispherical sections, the outermost sections of the housing being diametrically split and formed with an annular packing groove, a ring of packing material in said groove, a split contracting spring ring encircling said packing ring, and fastening means for securing the parts of said split section of the housing together, the split portions of said sectional housing being formed with arcuate grooves in the meeting faces thereof, and packing strips inserted in the last named grooves.

5. A ball cage for ball bearing universal joints, said cage being of arcuate formation and formed with ball receiving pockets, and tongues projecting from the opposite extremities of said cage.

6. A ball cage for ball bearing universal joints, said cage being of arcuate formation and formed with ball receiving pockets, and tongues projecting from the opposite extremities of said cage, one of said tongues being bendable.

7. A ball cage for ball bearing universal joints, said cage being of arcuate formation and formed with ball receiving pockets, and tongues projecting from the opposite extremities of said cage, said ball cage embodying a plurality of sections connected by a knuckle joint.

8. A ball cage for ball bearing universal joints, said cage being of arcuate formation and formed with ball receiving pockets, and tongues projecting from the opposite extremities of said cage, one of said tongues being bendable, said cage comprising a central joint having an opening forming one of the ball receiving pockets of the cage.

In testimony whereof I affix my signature.

WALTER LEON LINDSAY.